United States Patent
Gross et al.

(10) Patent No.: US 7,100,361 B2
(45) Date of Patent: Sep. 5, 2006

(54) METHOD FOR OPERATING AN INTERNAL COMBUSTION ENGINE

(75) Inventors: Jochen Gross, St. Wendel (DE); Winfried Langer, Illingen (DE); Andreas Kufferath, Markgroeningen (DE); Christian Koehler, Erligheim (DE); Armin Hassdenteufel, Sachsenheim-Ochsenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/492,010

(22) PCT Filed: Aug. 8, 2002

(86) PCT No.: PCT/DE02/02919

§ 371 (c)(1),
(2), (4) Date: Sep. 1, 2004

(87) PCT Pub. No.: WO03/031789

PCT Pub. Date: Apr. 17, 2003

(65) Prior Publication Data

US 2005/0016161 A1   Jan. 27, 2005

(30) Foreign Application Priority Data

Oct. 5, 2001 (DE) ................. 101 49 238

(51) Int. Cl.
*F01N 3/00* (2006.01)
(52) U.S. Cl. ............... 60/284; 60/285; 60/286
(58) Field of Classification Search ........... 60/284, 60/285, 286
See application file for complete search history.

(56) References Cited

U.S. PATENT DOCUMENTS

| 5,078,107 | A | 1/1992 | Morikawa |
| 6,302,081 | B1 * | 10/2001 | Moser et al. ............. 123/295 |
| 6,345,499 | B1 * | 2/2002 | Nishimura et al. ......... 60/277 |
| 6,510,835 | B1 * | 1/2003 | Mizuno et al. ........... 123/295 |
| 2001/0013329 | A1 | 8/2001 | Matsumoto et al. |

FOREIGN PATENT DOCUMENTS

| DE | 196 31 986 | 2/1998 |
| DE | 198 28 085 | 12/1999 |
| EP | 0 924 420 | 6/1999 |
| EP | 1081364 | 3/2001 |
| EP | 1081364 A2 * | 3/2001 |
| WO | 99 67523 | 12/1999 |
| WO | 00 42306 | 7/2000 |

* cited by examiner

Primary Examiner—Thomas Denion
Assistant Examiner—Loren Edwards

(74) Attorney, Agent, or Firm—Kenyon & Kenyon LLP

(57) ABSTRACT

An operating method for an internal combustion engine is described, especially for a motor vehicle, in which, in a first operating mode, fuel is injected preferably for heating a catalytic converter and, in at least one further operating mode, into a combustion chamber. In order to prevent a sudden change in the torque produced by the internal combustion engine during the switchover from/to the first operating mode, a distribution factor influencing torque is taken into account in an actual branch and/or in a setpoint branch of controller of the internal combustion engine.

7 Claims, 2 Drawing Sheets

METHOD FOR OPERATING AN INTERNAL COMBUSTION ENGINE

FIELD OF THE INVENTION

The present invention relates to a method for operating an internal combustion engine, especially of a motor vehicle, in which, in a first operating mode, fuel is preferably injected for heating a catalytic converter, and, in at least one further operating mode, into a combustion chamber, in which a controller controls/regulates the internal combustion machine, and in which switching takes place between the operating modes.

The present invention also relates to an internal combustion engine, especially for a motor vehicle, in which, in a first operating mode, fuel is able to be injected preferably for heating a catalytic converter and, in at least one further operating mode, into a combustion chamber, the internal combustion engine being able to be controlled/regulated by a controller, and switchable between the operating modes.

In addition, the present invention relates to a control unit for an internal combustion engine, especially of a motor vehicle, in which, in a first operating mode, fuel is preferably able to be injected for heating a catalytic converter, and, in at least one further operating mode, into a combustion chamber, the internal combustion engine being able to be controlled/regulated by a controller, and in which switching takes place between the operating modes.

BACKGROUND INFORMATION

In direct fuel injection, fuel is injected into the combustion chamber of the internal combustion engine, in a homogeneous operation during the intake phase or in a stratified operation during the compression phrase.

An operating mode of the internal combustion engine briefly denoted as "HOSP" is also known, especially for the rapid heating up of a catalytic converter, in which the fuel mass to be injected is divided up into two individual injections, of which the first takes place in the intake phase and the second in the compression phase of the internal combustion engine. The ratio of the injected fuel mass in the second injection to the fuel mass injected altogether is also denoted as distribution factor, and it influences the torque delivered by the internal combustion machine.

SUMMARY OF THE INVENTION

It is an object of the present invention to improve a method for operating an internal combustion engine to the extent that the switching from/to operating mode "HOSP" takes place in a manner that is as torque-neutral as possible, so that it is imperceptible to the driver of a motor vehicle.

This object is attained, in a method of the present invention, of the kind mentioned at the outset, in that, during switching from/to the first operating mode "HOSP", a distribution factor characterizing the first operating mode "HOSP" is taken into consideration in the controller.

Depending on the distribution factor selected, the torque of the internal combustion engine in operating mode "HOSP" deviates up to 30% from the torque the internal combustion engine is able to deliver in homogeneous operation, for example. Taking into account the dependence of the torque on the distribution factor makes it possible to calculate a torque modification possibly occurring during switching over from/to operating mode "HOSP", for example, to/from homogeneous operation, even before the time of the switching. Thereby it is possible, even before the switching, to calculate new injection parameters and the like, which are set at the time of switching of the operating modes, so as to avoid the torque modification mentioned.

It is of special advantage to undertake the consideration of the distribution factor according to the present invention in an actual branch and/or a setpoint branch of the controller of the internal combustion engine, which minimizes the computing effort, since existing torque models of the controller may be used, and an incorporation of the distribution factor into the already present torque structure is particularly simple to do.

One specific embodiment of the method according to the present invention provides that, in the actual branch of the controller, a torque reference variable is corrected using a distribution effectiveness that is a function of the distribution factor. The actual branch of the controller is used, among other things, for calculating the actual moment of the internal combustion engine, starting from the torque reference variable which is based on a reference state of the internal combustion engine, which is characterized by a stoichiometric air/fuel mixture as well as an optimal ignition angle.

The correction of the torque reference variable according to the present invention adjusts the torque reference variable to the actual conditions that are frequently different from the reference state, so that, depending upon the distribution factor, a correct value for the actual moment is supplied to the controller. One method variant according to the present invention is also very advantageous, in which in the setpoint branch of the controller a torque setpoint value is corrected using the distribution efficiency that depends on the distribution factor, so that for the further calculation of, for example, a fuel quantity to be injected as a function of the torque setpoint value, characteristics maps referring to the reference state may be used. The distribution efficiency is very expediently ascertained from a characteristics curve/characteristics map.

Of special importance is the implementation of the method according to the present invention in the form of a computer program which is provided for a control unit of an internal combustion engine in a motor vehicle in particular. The computer program has program codes suitable for carrying out the method according to the present invention, if it is executed on a computer. Furthermore, the program code may be stored on a computer-readable data carrier, such as in a so-called flash memory. In this case, the present invention is thus implemented by the computer program, so that this computer program represents the present invention in the same manner as the method, for the execution of which the computer program is suitable.

BRIEF DESCRIPTION OF THE DRAWINGS

FIG. 2b shows a cutout from the setpoint branch of the controller of FIG. 2a.

DETAILED DESCRIPTION

Figure 1:
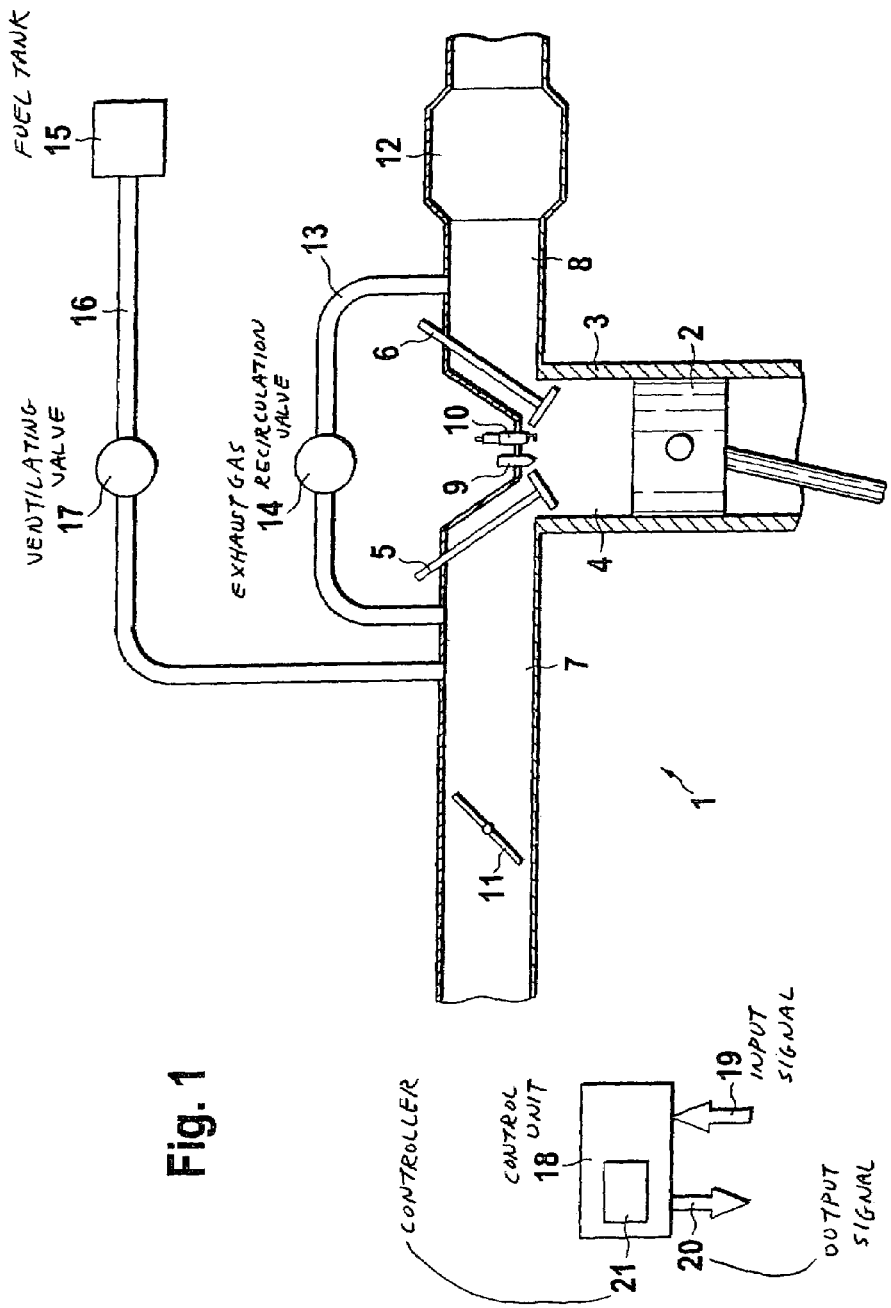
FIG. 1 shows a schematic block diagram of an exemplary embodiment of an internal combustion engine according to the present invention.

FIG. 1 shows an internal combustion engine 1 of a motor vehicle in which a piston 2 is movable back and forth in a cylinder 3. Cylinder 3 is equipped with a combustion chamber 4, which, among other things, is delimited by piston 2, an intake valve 5 and an exhaust valve 6. An intake manifold 7 is connected to intake valve 5, and an exhaust pipe 8 is connected to exhaust valve 6.

In the region of intake valve 5 and of discharge valve 6, a fuel injector 9 and a spark plug 10 project into combustion chamber 4. Fuel is able to be injected into combustion chamber 4 via injector 9. The fuel in combustion chamber 4 may be ignited by spark plug 10.

A rotatable throttle valve 11 through which air may be supplied to intake manifold 7 is accommodated in intake manifold 7. The quantity of supplied air is a function of the angle setting of throttle valve 11. In exhaust pipe 8 a catalytic converter 12 is accommodated, which is used for cleaning the exhaust gases created by the combustion of the fuel.

From exhaust gas pipe 8, an exhaust gas recirculation pipe 13 goes back to intake manifold 7. In exhaust gas recirculation pipe 13 an exhaust gas recirculation valve 14 is accommodated, using which, the quantity of the exhaust gas recirculated into intake manifold may be set.

From a fuel tank 15, a tank ventilating line 16 leads to intake manifold 7. In tank ventilating line 16 a tank ventilating valve 17 is accommodated, using which the quantity of fuel vapor supplied to intake manifold 7 from fuel tank 15 may be set.

Piston 2 is set into back and forth motion, by combustion of the fuel in combustion chamber 4, which is transmitted to a crank shaft (not shown) and exercises a torque upon it.

A control unit 18 receives input signals 19, which represent performance quantities of internal combustion engine 1 measured by sensors. For instance, control unit 18 is connected to an air mass sensor, a lambda sensor, an engine speed sensor or the like. Moreover, control unit 18 is connected to an accelerator sensor which generates a signal that indicates the setting of an accelerator operated by the driver, and thus gives the torque that is called for. Control unit 18 generates output signals 20, by which the performance of internal combustion engine 1 may be influenced via actuators. For example, control device 18 is connected to fuel injector 9, spark plug 10 and throttle valve 11 and the like, and generates the signals required for their control.

Among other things, control unit 18 is provided for controlling and/or regulating the performance quantities of internal combustion engine 1, which is symbolized by controller 21. For example, the fuel mass injected into combustion chamber 4 by fuel injector 9 is controlled and/or regulated by control unit 18 in particular with respect to low fuel consumption and/or low pollutant generation. To this end, control unit 18 is equipped with a microprocessor which has a program stored in a storage medium, particularly in a read-only memory, which is suitable for execution of the control and/or regulation mentioned.

In a first operating mode, the so-called operating mode "HOSP", a fuel mass to be injected into combustion chamber 4 is divided into two individual injections, of which the first takes place in the intake phase and the second in the compression phase of internal combustion engine 1. In this way, a rapid heating of catalytic converter 12 is effected, which is important, for example, for a cold start of internal combustion engine 1. The ratio of the fuel mass injected in the second injection to the total injected fuel mass is designated as the distribution factor.

In an additional mode of operation, a so-called homogeneous operation of internal combustion engine 1, throttle valve 11 is partially opened or closed as a function of the desired torque. The fuel is injected by injector 9 into combustion chamber 4 during an intake phase caused by piston 2. Turbulence is created in the injected fuel due to the simultaneous air intake through throttle valve 11, and the fuel is therefore distributed in combustion chamber 4 in an essentially uniform manner. Then the fuel/air mixture is compressed during the compression phase and ignited by spark plug 10. The expansion of the ignited fuel drives piston 2. During homogeneous operation, the torque created is a substantially a function of the position of throttle valve 11. From the standpoint of low emissions, the fuel/air mixture is set as closely as possible to lambda=1 or lambda<1.

Between the operating modes described of internal combustion engine 1, back and forth or reversed switching may occur. Such switchovers are carried out by control unit 18. For example, after a cold start, the first operating mode, namely operating mode "HOSP", may be set, by the use of which catalytic converter 12 is rapidly heated to operating temperature. Depending on the distribution factor, the torque of internal combustion engine 1 is up to 30% less than in homogeneous operation.

As soon as catalytic converter 12 has reached its operating temperature, control unit 18 switches internal combustion engine 1 over to homogeneous operation. In order to achieve a switchover that is torque-neutral, the influence of the distribution factor on the torque of internal combustion engine 1 in operating mode "HOSP" is taken into consideration in the manner explained below.

Figure 2A:
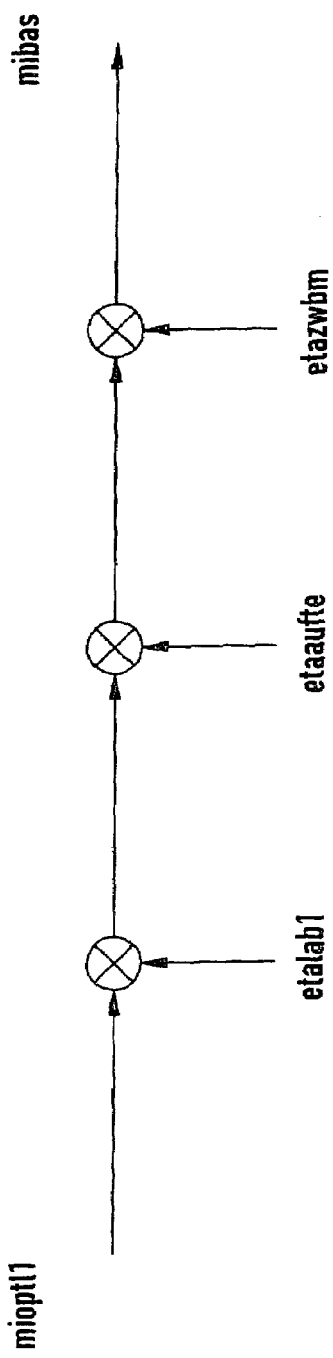
FIG. 2a shows a cutout from the actual branch of a controller.

FIG. 2a shows a cutout from the actual branch of controller 21, which has a torque reference value mioptl1 at its input end. This torque reference value mioptl1 represents the maximum torque internal combustion engine 1 (FIG. 1) can deliver in response to stoichiometric air/fuel mixture, i.e. at lambda=1, and at an optimally set ignition angle. Torque reference value mioptl1 is ascertained, for example, on a test stand and serves as a reference value for all characteristic curves/characteristics maps used in controller 21.

At the output end, the cutout shown in FIG. 2a has actual moment mibas, which is calculated from torque reference value mioptl1.

Internal combustion engine 1 is not always operated at lambda=1 and the optimal ignition angle, so that the actual available torque, actual moment mibas, deviates from maximum possible torque reference value mioptl1. This deviation is taken into account by computation in controller 21.

To do so, torque reference value mioptl1 is first multiplied by a lambda efficiency etalab1, which tells how the torque of internal combustion engine 1 changes as a function of lambda. In case lambda=1 applies, the lambda efficiency etalab1 turns out to have a value of 100%. Correspondingly, for a value of lambda <>1, for which the torque of internal combustion engine 1 is, for example, only 80% of the torque reference value, a lambda efficiency of 80% comes about.

Analogously to this, the dependence of the torque of internal combustion engine 1 on the distribution factor is taken into account in that the product of lambda efficiency etalab1 and torque reference value mioptl1 is multiplied by a distribution efficiency etaaufte.

Distribution efficiency etaaufte, analogously to etalab1, gives the dependence of the torque on the distribution factor, and is advantageously stored in the form of a characteristic curve in control unit 18, preferably in rewritable memory, such as a flash memory.

Investigations have shown that distribution efficiency etaufte is also a function of the rotational speed of internal combustion engine 1, so that an especially accurate taking into account of the distribution factor is possible with the aid of a characteristics map, which, besides the distribution factor, also contains the rotational speed.

Finally, there is a further multiplication step by ignition angle efficiency etazwbm. The resulting product represents actual moment mibas, which is processed further by controller 21 for the control/regulation of internal combustion engine 1.

The formulation of the dependence of the torque on the variables lambda, distribution factor and ignition angle as efficiency is very advantageous, because thereby a multiplicative linkage of the various influential factors is made possible. It is also possible, to multiply all the efficiencies with one another, to obtain an overall efficiency.

Figure 2B:
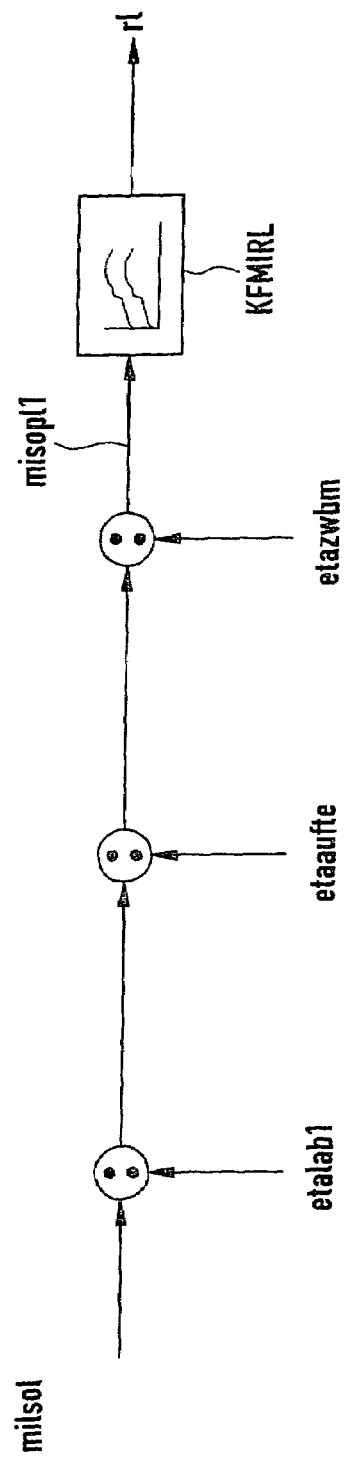

FIG. 2*b* shows a cutout from the setpoint branch of controller 21, at whose input a driver command moment milsol, derived from an accelerator setting, is present. Driver command moment milsol is not related to the state lambda=1, and is therefore prepared by computation for further processing in the setpoint branch of controller 21.

Setpoint torque misopl1 calculated back to lambda=1 is obtained, inversely to the calculation of actual moment mibas in the actual branch, by successive division of driver command moment milsol by lambda efficiency etalab1, distribution efficiency etaaufte and by ignition angle efficiency etazwbm.

Setpoint torque misopli is supplied to a characteristics map KFMIRL, besides other variables such as the engine speed (not shown), which gives the output value r1 of the cutout from the setpoint branch shown in FIG. 2*b*.

Output value r1 is a measure for the setpoint value of the relative air charge of combustion chamber 4, from which, at a given lambda, the fuel quantity to be injected may be ascertained.

The described inclusion of the distribution efficiency etaaufte in the actual and the setpoint branch of controller 21 makes possible a torque-neutral switchover from/to first operating mode "HOSP", in that the torque which actually sets in is correctly calculated.

Besides the travel comfort, the method described also enormously increases travel safety. Especially during switchover from first operating mode "HOSP" in homogeneous operation, in which internal combustion engine 1 usually delivers a torque that is up to 30% greater, it is important to avoid a torque modification, in order to prevent a sudden unintended acceleration of the motor vehicle.

Although first operating mode "HOSP" is usually set at cold start of internal combustion engine 1, it can happen that, even after a longer operating time, switchover occurs once more, for example, from homogeneous operation to first operating mode "HOSP", so that the taking into account of distribution factor is of advantage even after a cold start of internal combustion engine 1.

The invention claimed is:

1. A method for operating an internal combustion engine, comprising:
   in a first operating mode, injecting a fuel into a combustion chamber;
   in the first operating mode, dividing the fuel into two individual injections, of which a first injection is injected in an intake phase and a second injection is injected in a compression phase of the internal combustion engine;
   injecting the fuel into the combustion chamber in at least one additional operating mode, wherein in the at least one additional operating mode, the fuel is injected in the intake phase of the internal combustion engine;
   causing a controller to one of control and regulate the internal combustion engine;
   performing a switchover between the first operating mode and the at least one additional operating mode, wherein in one of a switchover from the first operating mode and a switchover to the first operating mode, a distribution factor corresponding to the first operating mode is taken into account in the controller, and wherein the distribution factor gives a ratio of injected fuel in the second injection to the total injected fuel; and
   in a setpoint branch of the controller, correcting a torque setpoint value using a distribution efficiency that is a function of the distribution factor.

2. The method as recited in claim 1, wherein:
   the fuel is injected into the combustion chamber in order to heat a catalytic converter.

3. The method as recited in claim 1, further comprising:
   in an actual branch of the controller, correcting a torque reference value using the distribution efficiency.

4. The method as recited in claim 1, further comprising:
   ascertaining the distribution efficiency from a characteristics curve/characteristics map.

5. A computer-readable storage medium for storing a computer program for a control unit of an internal combustion engine, the computer program having a program code that when executed results in a performance of the following:
   in a first operating mode, injecting a fuel into a combustion chamber;
   in the first operating mode, dividing the fuel into two individual injections, of which a first injection is injected in an intake phase and a second injection is injected in a compression phase of the internal combustion engine;
   injecting the fuel into the combustion chamber in at least one additional operating mode, wherein in the at least one additional operating mode, the fuel is injected in the intake phase of the internal combustion engine;
   causing a controller to one of control and regulate the internal combustion engine;
   performing a switchover between the first operating mode and the at least one additional operating mode, wherein in one of a switchover from the first operating mode and a switchover to the first operating mode, a distribution factor corresponding to the first operating mode is taken into account in controller, and wherein the distribution factor gives a ratio of injected fuel in the second injection to the total injected fuel; and
   in a setpoint branch of the controller, correcting a torque setpoint value using a distribution efficiency that is a function of the distribution factor.

6. A control unit for operating an internal combustion engine, comprising:
   an arrangement for, in a first operating mode, injecting a fuel into a combustion chamber;
   an arrangement for, in the first operating mode, dividing the fuel into two individual injections, of which a first injection is injected in an intake phase and a second injection is injected in a compression phase of the internal combustion engine;
   an arrangement for injecting the fuel into the combustion chamber in at least one additional operating mode, wherein in the at least one additional operating mode, the fuel is injected in the intake phase of the internal combustion engine;
   an arrangement for causing a controller to one of control and regulate the internal combustion engine;

an arrangement for performing a switchover between the first operating mode and the at least one additional operating mode, wherein in one of a switchover from the first operating mode and a switchover to the first operating mode, a distribution factor corresponding to the first operating mode is taken into account in controller, and wherein the distribution factor gives a ratio of injected fuel in the second injection to the total injected fuel; and an arrangement for, in a setpoint branch of the controller, correcting a torque setpoint value using a distribution efficiency that is a function of the distribution factor.

7. An internal combustion engine, comprising:

a control unit including:

an arrangement for, in a first operating mode, injecting a fuel into a combustion chamber;

an arrangement for, in the first operating mode, dividing the fuel into two individual injections, of which a first injection is injected in an intake phase and a second injection is injected in a compression phase of the internal combustion engine;

an arrangement for injecting the fuel into the combustion chamber in at least one additional operating mode, wherein in the at least one additional operating mode, the fuel is injected in the intake phase of the internal combustion engine;

an arrangement for causing a controller to one of control and regulate the internal combustion engine;

an arrangement for performing a switchover between the first operating mode and the at least one additional operating mode, wherein in one of a switchover from the first operating mode and a switchover to the first operating mode, a distribution factor corresponding to the first operating mode is taken into account in controller, and wherein the distribution factor gives a ratio of injected fuel in the second injection to the total injected fuel; and an arrangement for, in a setpoint branch of the controller, correcting a torque setpoint value using a distribution efficiency that is a function of the distribution factor.

* * * * *